(12) United States Patent
Ziegler (10) Patent No.: US 8,446,039 B2
(45) Date of Patent: May 21, 2013

(54) APPARATUS, SYSTEM AND METHOD EMPLOYING A UPS

(75) Inventor: William Ziegler, Reading, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 23 days.

(21) Appl. No.: 12/635,728

(22) Filed: Dec. 11, 2009

(65) Prior Publication Data
US 2011/0140523 A1    Jun. 16, 2011

(51) Int. Cl.
*H02J 9/00* (2006.01)

(52) U.S. Cl.
USPC .................. 307/64; 307/43; 307/65; 307/66; 174/68.1

(58) Field of Classification Search
USPC ............ 307/11, 42–43, 64–66, 147; 174/68.1
See application file for complete search history.

(56) References Cited

U.S. PATENT DOCUMENTS

| | | | | |
|---|---|---|---|---|
| 5,068,763 A | * | 11/1991 | Brown et al. | 361/659 |
| 5,214,314 A | * | 5/1993 | Dillard et al. | 307/147 |
| 5,694,312 A | * | 12/1997 | Brand et al. | 363/144 |
| 6,121,695 A | * | 9/2000 | Loh | 307/64 |
| 6,754,066 B2 | * | 6/2004 | Doan et al. | 361/600 |
| 7,782,596 B2 | * | 8/2010 | Ross | 361/648 |
| 2004/0000815 A1 | | 1/2004 | Pereira | |
| 2004/0231875 A1 | * | 11/2004 | Rasmussen et al. | 174/50 |
| 2007/0168088 A1 | * | 7/2007 | Ewing et al. | 700/295 |
| 2007/0217178 A1 | * | 9/2007 | Johnson et al. | 361/826 |
| 2007/0230094 A1 | | 10/2007 | Carlson | |
| 2009/0073641 A1 | | 3/2009 | Ross | |
| 2009/0225501 A1 | * | 9/2009 | Luebke et al. | 361/644 |

OTHER PUBLICATIONS

International Search Report and Written Opinion from corresponding International Application No. PCT/US2010/058659 mailed Apr. 21, 2011.
International Search Report for PCT/US2010/058659 mailed Apr. 21, 2011.

* cited by examiner

*Primary Examiner* — Jared Fureman
*Assistant Examiner* — Alfonso Perez Borroto
(74) *Attorney, Agent, or Firm* — Lando & Anastasi, LLP (57) ABSTRACT

A method of installing a power distribution system in a facility includes acts of: obtaining a power distribution unit including at least one rack mounted power distribution unit, the power distribution unit including an electrical connection having an electrical bus configured to directly connect to a riser of a power busway; installing the power busway from a terminus located at the output of the UPS to the electrical connection at the power distribution unit; and directly connecting the power busway to the output of the UPS with a busbar-to-busbar connection between the output of the UPS and the terminus of the busway.

20 Claims, 5 Drawing Sheets

APPARATUS, SYSTEM AND METHOD EMPLOYING A UPS

BACKGROUND OF INVENTION

1. Field of Invention

The invention generally concerns power distribution systems, and in particular, power distribution systems including a UPS.

2. Discussion of Related Art

The use of power busway traditionally involves an enclosure which houses multiple electrical conductors in the form of bus. The busway is generally mounted above the electrical load being supplied, for example, secured to the ceiling or other overhead structure. Cable connections are generally employed to complete the connection from the busway to the load. Cable connections are also employed to connect the source of power to the busway. The cable connections to the load are typically made at a tap box.

A disadvantage of cable connections is that such connections often require a custom installation of electrical conduit between the busway and the source of power and sometimes between the busway and the load. Each of these connections therefore involves custom conduit bending and installation and the custom installation of cables within the conduit, with all of the preceding done in the field. As a result of the required field work, specialized tools and equipment are required. Further, a considerable amount of scrap material, metal shavings and the like may be misplaced or left behind upon completion of the installation.

SUMMARY OF INVENTION

It would therefore be advantageous to provide a power distribution system including a UPS where at least some of the power connections including the power connection from the UPS to a busway are made via a direct connection without the use of cable. In particular, it is advantageous to provide the preceding where the connections are completed on a busbar-to-busbar basis, for example, without the use of cable. The preceding approach helps eliminate custom field installation work that adds cost and complexity.

In one aspect an uninterruptible power supply (UPS), includes a first input coupled to a source of AC power; first power converter circuitry coupled to the first input, where the first power converter circuitry includes a first plurality of power switches employed to draw current in a controlled manner from the source of AC power, and a first output. According to one embodiment, the UPS also includes second power converter circuitry including a second input coupled to the first output, and a second output, where the second power converter circuitry includes a second to plurality of power switches employed to draw DC current in a controlled manner and to provide AC power at the second output. According to a further embodiment, the UPS includes an electrical enclosure housing each of the first power converter circuitry and the second power converter circuitry where the electrical enclosure includes an electrical connection coupled to the second output and configured for direct attachment to a riser of a power busway.

In another aspect, an electrical power system includes a power busway including a first terminus, at least one second terminus, and a first busway riser included in the power busway at the first terminus. According to one embodiment, the power system also includes an uninterruptible power supply (UPS) including an input, an output, power conversion circuitry configured to receive AC power, convert the AC power to DC power, and convert the DC power to AC power provided at the output, and an electrical enclosure housing the power converter circuitry and including an electrical connection coupled to the output and configured for a direct attachment to the first busway riser. According to a further embodiment, the electrical power system includes at least one power distribution unit configured for direct attachment to a second busway riser included in the power busway at the at least one second terminus.

In still another aspect, a method of installing a power distribution system in a facility includes acts of: obtaining a power distribution unit including at least one rack mounted power distribution unit, the power distribution unit including an electrical connection having an electrical bus configured to directly connect to a riser of a power busway; installing the power busway from a terminus located at the output of the UPS to the electrical connection at the power distribution unit; and directly connecting the power busway to the output of the UPS with a busbar-to-busbar connection between the output of the UPS and the terminus of the busway.

BRIEF DESCRIPTION OF DRAWINGS

The accompanying drawings, are not intended to be drawn to scale. In the drawings, each identical or nearly identical component that is illustrated in various to figures is represented by a like numeral. For purposes of clarity, not every component may be labeled in every drawing. In the drawings.

DETAILED DESCRIPTION

Figure 1:
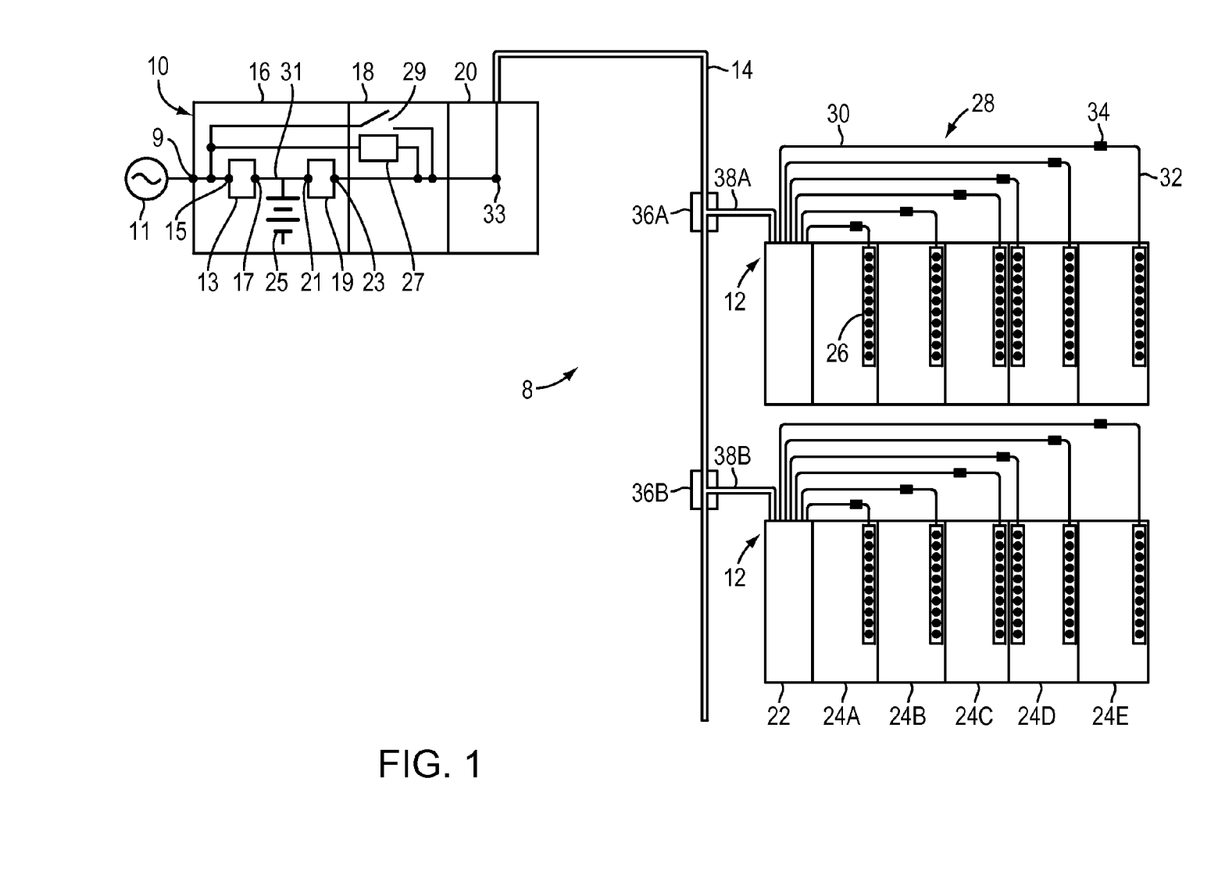
FIG. 1 illustrates a block diagram of a power distribution system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Where power distribution systems are installed to supply information technology load (IT) it is preferred to reduce or eliminate power cabling that was formerly installed beneath such equipment under raised floors. The installation of busways to supply IT equipment provides for a flexible and scalable approach that connects power distributions units (power panels) to the source of electrical power while avoiding the installation of power conductors beneath raised floors. FIG. 1 illustrates a power distribution system 8 in accordance with an embodiment in which a UPS is directly connected to one or more power distribution units via a power busway. The power distribution system 8 includes a source of AC power 11. The power distribution system 8 also includes a UPS 10, a plurality of power distribution units 12 and a power busway 14. In the illustrated embodiment, the UPS 10 and the to power distribution units 12 are connected via the power busway 14. Further, in the illustrated embodiment, the UPS 10 includes one or more electrical enclosures 16 that house power converter circuitry, one or more electrical enclosures 18 that house a static switch and/or a maintenance by-pass switch, and an enclosure 20 that houses an electrical connection. The UPS 10 also includes an input 9 and an output 33. According to some embodiments, the input 9 is connected to the source of AC power 11 and the output 33 is connected to the power busway 14, for example, at the electrical connection.

According to one embodiment, the UPS 10 includes first power converter circuitry 13 including an input 15 and an output 17, second power converter circuitry 19 including an input 21 and an output 23, and a DC link 31 which is connected between the output 17 and input 21. In some embodiments, the output 23 of the second power converter and the output 33 of the UPS can be the same point electrically. However, according to other embodiments additional circuitry is included between the output 23 of the second power converter circuitry and the output 33 of the UPS 10. According to the illustrated embodiment, the UPS 10 can also include either or both of a solid state switch 27 and a maintenance bypass switch 29. As illustrated, each of the solid state switch 27 and maintenance bypass 29 are located in the second electrical enclosure 18. However, either or both of the solid state switch 27 and the maintenance bypass 29 may be located remote from the UPS 10, i.e., located remote from the second electrical enclosure 18. Further, where one or both of the solid state switch 27 and the maintenance bypass 29 are physically located within the UPS 10, the locations of these devices in the enclosure may vary from that illustrated.

In some embodiments, the system 8 includes one or more DC power sources, for example, batteries 25. In various embodiments, one or more DC sources such as the batteries 25 may be connected to the DC link 31. Further, the DC source may be located within the UPS 10 while in other embodiments the DC source (batteries or another type of DC source) may be located remote from the UPS 10. Other types of DC sources used alone or in combination with the batteries 25 may include extended runtime DC sources, for example, rotary generators, fuel cells, solar power, etc. In some embodiments, a first source of DC power is connected to the DC link 31 while a second source of DC power is connected to the first power converter circuitry 13, for example, at an additional input to the first power converter circuitry 13. According to one embodiment, the first source of DC power is an extended runtime source and the second source of DC power includes the batteries 25.

According to some embodiments, the first power converter circuitry 13 includes a plurality of solid state power switches that are employed to draw current in a controlled manner from the source of AC power. In a further embodiment, the second power converter circuitry 19 includes a second plurality of solid state switches which are employed to draw DC current in a controlled manner to provide AC power at the output 23. Accordingly, the specific configuration of the power converter circuitry included in the enclosure 16 can vary depending on the type of UPS employed. For example, the UPS can include an on-line UPS configuration. In addition, embodiments may be employed in a wide variety of applications including those employing a line-interactive UPS design, delta conversion UPSs, flywheel UPSs, motor-generator/battery UPSs and engine-coupled UPSs.

Where the second power converter circuitry draws DC current, it can do so by drawing the DC current provided at the output of the first power converter circuitry. Further, although a single electrical enclosure 16 is illustrated as housing each of the first power converter circuitry 13 and the second power converter circuitry 19, the electrical enclosure 16 can include a plurality of enclosures where, for example, a first enclosure houses the first power converter circuitry 13 and a second adjacent enclosure houses the second power converter circuitry 19. Additional configurations are contemplated including integral batteries included in the UPS 10 and/or remote batteries or other sources of DC power included in the UPS 10 but located remote from the enclosures 16, 18, and 20, as described above.

Accordingly, the relative locations of the various components and/or sections of the UPS may differ from that illustrated in FIG. 1 and embodiments are intended to reach a variety of UPS configurations that are possible. For example, in one embodiment, a UPS includes a first plurality of close-coupled electrical equipment racks that provide the first enclosure 16 and a second plurality of close-coupled to electrical equipment racks that together provide the electrical enclosure 18. The preceding may also be true for the electrical enclosure 20 because it too may also include either one or a plurality of close-coupled electrical enclosures. For example, a first phase conductor of the power busway 14 can be connected to a first phase of the UPS output in a first electrical enclosure, a second phase of the power busway 14 can be connected to a second phase of the UPS output in a second electrical enclosure, etc.

In addition, in various embodiments, further changes to the physical arrangement of the electrical enclosures which house the respective system elements of the UPS 10 may be provided relative to those illustrated in FIG. 1. For example, the solid state switch 27 may be located in an enclosure that is centrally located within a plurality of close-coupled electrical equipment racks. For example, centrally located within a plurality of close-coupled electrical equipment racks that include the electrical equipment enclosure 16 and the electrical equipment enclosure 20. The preceding configuration may be employed, for example, where the UPS includes a plurality of first power converter circuitry 13, i.e. two AC-to-DC power converters operating in parallel. In this configuration, the UPS can include a first electrical enclosure housing a first of the two AC-to-DC power converters and a second electrical enclosure housing a second of the two AC-to-DC power converters. According to this embodiment, the first and second electrical enclosures are close coupled at opposite ends of a centrally located electrical enclosure 18 which houses the solid state switch 27. Similarly, the UPS can include a plurality of second power converter circuitry, i.e., a plurality of DC-to-AC converters operating in parallel. Further, as indicated above, the maintenance bypass 29 may be remotely located from the UPS 10.

In the illustrated embodiment, the power distribution units 12 each include one or a plurality of electrical enclosures (or cabinets) including a remote power panel 22 and one or more equipment racks 24A-24E. In accordance with one embodiment, the remote power panel 22 includes a plurality of branch circuit modules. Such an approach is illustrated and described in detail in U.S. Pat. Nos. 7,606,014 and 7,619,868. Each of these U.S. patents which are commonly assigned to American Power Conversion Corp., are hereby incorporated by reference in their entirety. In to one embodiment, each of the branch circuit modules receives power within the remote power panel 22 and distributes the power via a cable connection. Further, the branch circuit modules can include one or more overcurrent protection devices. Accordingly, the branch circuit module can include one or more multi-pole or single pole circuit breakers.

In the illustrated embodiment, each of the equipment racks includes a power strip 26 that includes a plurality of receptacle outlets. Further, the system can include one or a plurality of power cables 28 that may include a first power cable 30 and a second power cable 32 connected together at a coupling (or connector) 34. According to this embodiment, each power cable 28 connects one or more of the power strips 26, respectively, to the remote power panel 22. According to another embodiment, a continuous power cable that does not include the coupling 34 can connect the branch circuit module of the remote power panel 22 to the equipment rack 24 and power strip 26.

In addition, the equipment racks can include equipment that is connected to the power strip 26 (for example, plugged into). In one embodiment, one or more of the equipment racks include one or a plurality of servers and/or other IT equipment which is supplied power from the power strip 26. According to other embodiments, power strips 26 are not employed. Instead, equipment located in the equipment racks 24A-24B can be connected to branch circuit modules located in the remote power panels 22 by direct connection to the power cable. The preceding approach may be employed, for example, where the power cable 28 includes an integral connector at the load-end of the cable.

The system 8 can also include one or more tap boxes 36. According to one embodiment, the tap boxes 36 are employed to connect the power busway 14 to the power distribution unit 12. As illustrated, where a plurality of power distribution units 12 are connected to the power busway 14, the system can include separate tap box 36A, 36B for each of the respective power distribution units 12. Accordingly, in some embodiments, the tap box 36 includes overcurrent protection and short circuit protection for the power distribution unit 12 to which it is connected. According to the illustrated embodiment, the power busway 14 can include one or more bus taps 38 where the bus taps include power bus that is connected to the power busway 14 at a tap box 36 and to a bus connection in the remote power panel 22. In accordance with one embodiment, the bus tap is connected via a busbar-to-busbar connection at each of the tap box 36 and the remote power panel 22. The resulting connections can provide the system 8 with a completely cable-free circuit that couples the output of the UPS to the remote power panel 22. In other embodiments, a busbar-to-busbar connection is employed to connect the UPS to the power busway while a cable connection is employed to connect the tap box 36 to the remote power panel 22.

The system 8 illustrated in FIG. 1 can operate at any voltage level suitable for power distribution, for example, low voltage power distribution having a nominal operating voltage of 600 volts or less. In one embodiment, the power distribution system 8 operates at a nominal voltage of 400 volts. Further, embodiments can be employed to distribute AC power or DC power depending upon the application.

In some embodiments, the tap boxes 36 may include plug-in connections. Further, the tap boxes may include overcurrent protection provided by either or both a circuit breaker and a fuse. In accordance with one embodiment, the tap box 36 includes a fuse with a rating of 30 amps, 60 amps or 100 amps and does not include a circuit breaker. In accordance with another embodiment, the tap box 36 includes a circuit breaker but does not include a fuse. Further, where the tap box 36 includes a fuse, the tap box can also include a knife switch that allows a mechanical disconnection between the power busway 14 and the bustap 38.

According to some embodiments, the overall approach illustrated by the system 8 of FIG. 1 provides a flexible and more efficient installation of a power distribution system. According to some embodiments, the approach is particularly advantageous for supplying power to IT load where a plurality of relatively small individual loads included in each rack result in a high power density.

The specific configuration of the equipment racks 24 can vary depending upon the application. In some embodiments, the power distribution units are mounted on to wheels such that they can be rolled into a location adjacent a connection to the power busway 14. This approach allows the power distribution units to be individually aligned with the power busway taps even where the location of the tap box 36 is fixed.

Figure 2:
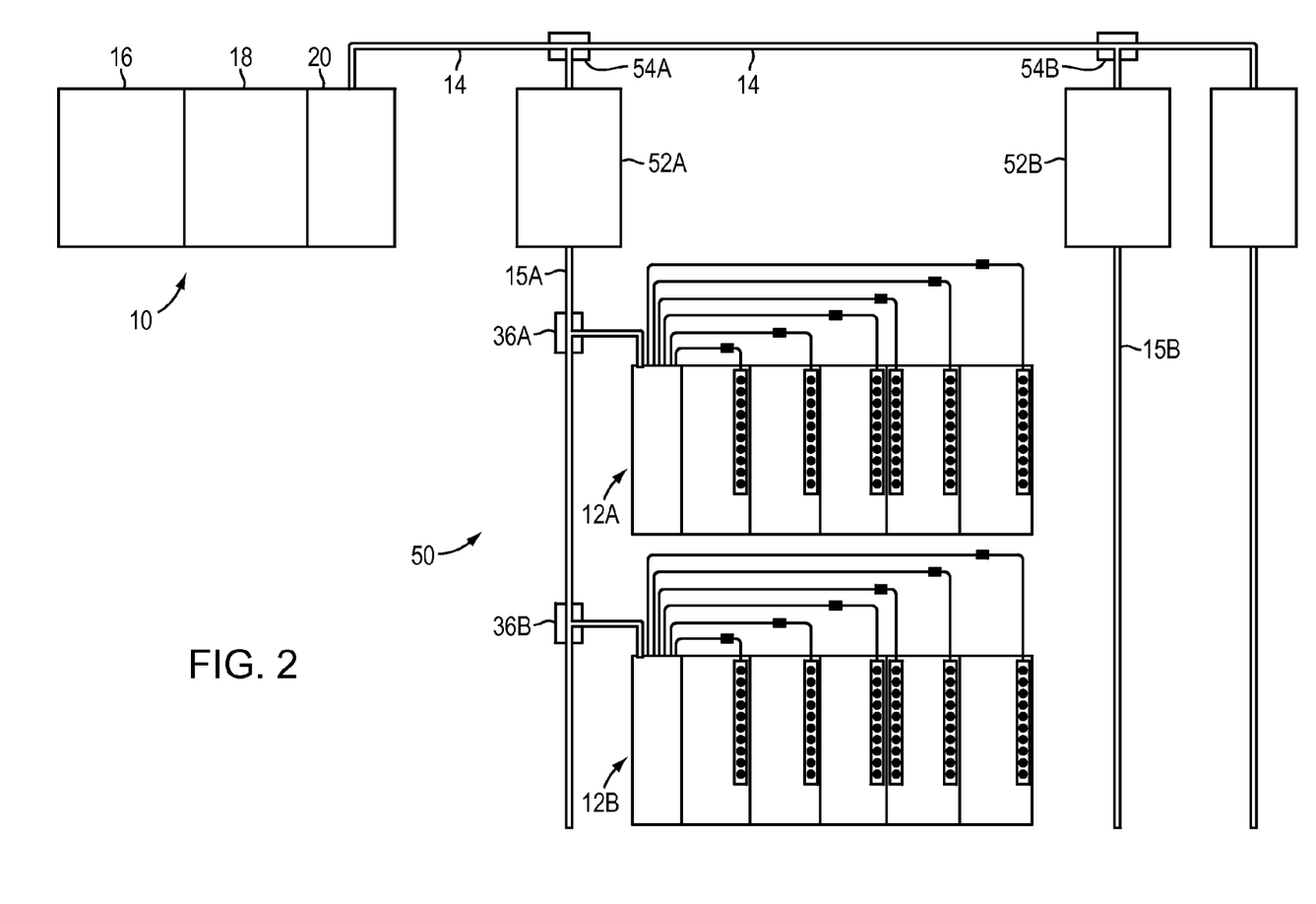
FIG. 2 illustrates a power distribution system according to a further embodiment.

FIG. 2 illustrates a power distribution system 50 that employs a transformer to change the voltage supplied at the output of the UPS before the UPS output is coupled to the power distribution units. For example, the system 50 may distribute power to the power distribution units 12 at a voltage that differs from the UPS output voltage. Some example UPS output voltages include any of 400 volts, 240 volts, 480 volt/240 volts and 415/240 volts. As illustrated here, the UPS includes the first enclosure 16, the second enclosure 18 and the third enclosure 20 as previously described concerning FIG. 1. The power distribution system 50 also includes a first power busway 14 directly connected to an output of the UPS 10. In addition, the power distribution system 50 includes a second power busway 15. The power distribution system also includes a transformer unit 52. In the illustrated embodiment, the transformer unit 52 includes a transformer to create a utilization voltage that differs from the output voltage of the UPS. For example, the secondary of the transformer included in the power distribution 52 can be 280/120 volts where the output voltage of the UPS is 415/240 volts or another voltage that differs from 208/120.

The system 50 can include a plurality of power distribution units 12A, 12B and a plurality of transformer units 52A, 52B. The system 50 can also include one or more first tap boxes 54A, 54B and one or more second tap boxes 36A, 36B.

To maintain a modular approach, transformer units can be included or added to the power distribution system 50 to meet increased electrical loads. For example, in the illustrated embodiment, a transformer unit 52B is included to supply a second plurality of power distribution units. According to one embodiment, this allows for moderately sized transformers included in each of the transformer units where transformers can be more efficiently operated closer to their maximum rating with fewer losses. Further, the first tap boxes 54A, 54B can provide for connection of the individual transformer units 52A, 52B to the first power busway 14. The second power busway 15 provides for a connection of the secondary of the transformer to included in the transformer unit 52 to the corresponding power distribution unit 12.

According to this embodiment, the second tap boxes 36A, 36B can be employed to provide for a connection of individual ones of the multiple power distribution units 12A, 12B to the second power busway 15. According to one embodiment, a rated current of the power busway 14 matches a rated current output of the UPS 10. The second power busway 15, in various embodiments, may or may not be of the same construction and ratings of the first power busway 14. For example, in one embodiment, the current rating of the second power busway 15 differs from the current rating of the first power busway 14 as a result of the difference in operating voltage of the two power busways and/or because a single power busway 15 may be supplying only a portion of the total rated output of the UPS 10. For example, as illustrated in FIG. 2, a second transformer unit 52B can be connected to the power busway 14 at the tap box 54B. A second power busway 15B can be connected to the secondary of the transformer included in the power distribution 52B where the power busway 15B connects a second plurality of power distribution units to the output of the UPS via the transformer unit 52B and power busway 14. Further, in some embodiments, the nominal current rating of the second power busway can be sized to match the current rating of the transformer included in the transformer unit to which it is connected.

According to one embodiment, the transformer units 52A, 52B each include a 500 KW transformer. The transformer units can be sized to match the anticipated demand of the connected load. In addition, where multiple transformer units 52A, 52B are included in the power distribution system 50, the transformer units can be sized differently from one another.

Figure 3:
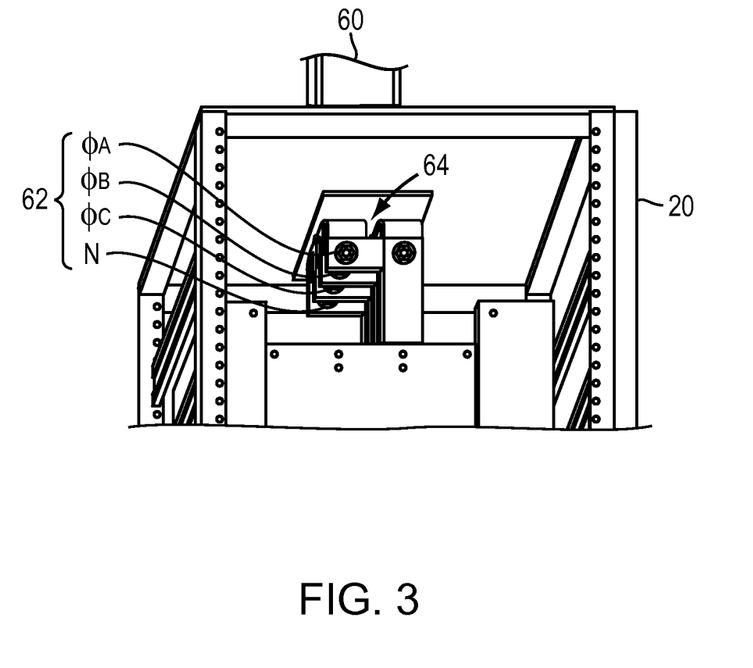
FIG. 3 illustrates a busway-to-UPS connection in accordance with one embodiment.

FIG. 3 illustrates a busbar-to-busbar connection of the power busway 14, for example, power busway 14 as illustrated in FIGS. 1 and 2, to a UPS in accordance with one embodiment. As illustrated, the connection is included in the electrical equipment enclosure, for example, the third enclosure 20 included in the UPS. According to the embodiment, illustrated in FIG. 3, the power busway includes a riser 60. The power busway including the riser 60 houses a plurality of busbar 62 including one or more phase conductors, a neutral conductor, and a ground conductor. to The termination is completed within the enclosure by connecting the busway riser 60 to the plurality of busbar 62 in the enclosure 20 where the plurality of busbar 62 are provided at the output 33 of the UPS.

In various embodiments, the plurality of busbar 62 can be manufactured from any type of electrical conductor such as copper, aluminum, or alloys of the preceding as well as other conductive metals. Further, the busway can include a fewer or a greater number of conductors. For example, the plurality of busbar 62 may include a different quantity of phase conductors. In addition, the plurality of busbar may or may not include either of a neutral conductor or a ground conductor.

FIG. 3 also illustrates a busway termination 64 that provides a terminus of the power busway, for example, a terminus of the power busway 14. For example, the busway termination 64 may be provided with a flanged end as illustrated in FIG. 3 to provide room for the bolted busbar connections that complete the termination of the busway riser 60 at the output 33 of the UPS.

Other mechanical configurations of busway termination 64 may be employed to provide a busbar-to-busbar connection between a terminus of the power busway and the UPS. In the illustrated embodiment, each of the phase conductors and the neutral conductor include a plurality of busbars (2) that allows for an increased current carrying capacity for each of the conductors. Alternatively, a single busbar may be used for each conductor in the plurality in the power busway. Further, the power busbar and UPS output may include only a three pole system with or without a ground bus. The power busway may be supplied to meet a variety of applications, for example, the power busway may be rated anywhere from 225 amps to 5000 amps and the plurality of busbar 62 can be sized to carry the rated current for the selected application.

The busway riser 60 may be included as part of a horizontal riser that initially extends in a vertical direction from a top of the third enclosure 20 then is redirected through the use of a busway elbow to make a connection to a horizontal run to a power busway. According to another embodiment, the busway riser 60 may be included in a vertical riser that extends as installed in a vertical direction through a series of different vertical elevations or floors of a facility.

As mentioned above, variations in the location of the enclosures 16, 18 and 20 within the UPS 10 are contemplated. As illustrated in FIGS. 1-3, the third enclosure 20 is an end unit, however, alternate embodiments can be employed provided that the output of the UPS 10 can be connected to terminus of the power busway 14. In one embodiment, the third enclosure 20 is centrally located among the electrical enclosures included in the UPS 10. According to another embodiment, a third enclosure 20 is not employed. Instead, the busway riser 60 connects to the UPS 10 at either the first enclosure 16 or the second enclosure 18. Accordingly, in one embodiment, the busway termination 64 is located at the top of the second enclosure 18. In an alternate embodiment, the busway termination 64 is located at the top of the first enclosure 16.

Figure 4:
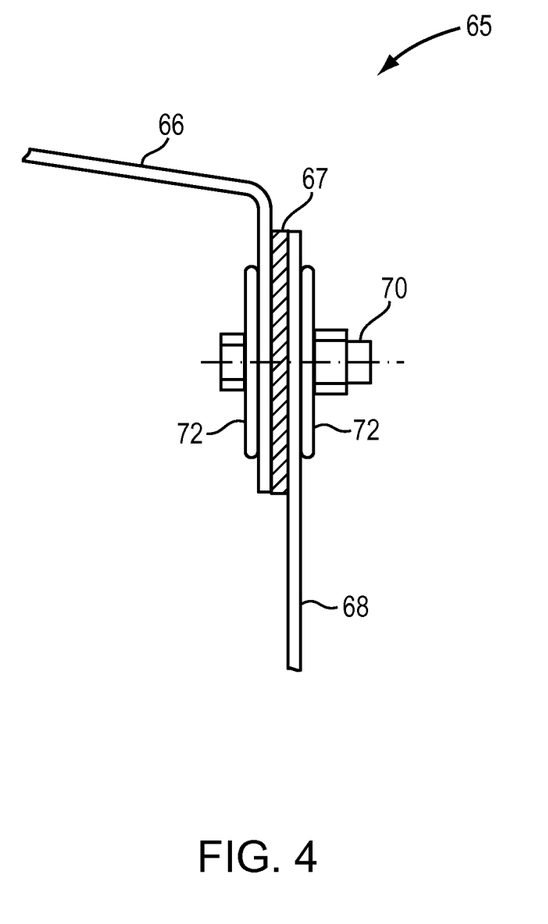
FIG. 4 illustrates an electrical connection in accordance with one embodiment.

FIG. 4 illustrates a termination 65 between an output of the UPS 10 and the power busway 14. The termination 65 provides a mechanical connection as well as an electrical connection between the UPS 10 and the power busway 14. FIG. 4 illustrates a single bolted busbar-to-busbar connection which can be included in a plurality of busbar-to-busbar connections, for example, the plurality of connections illustrated in FIG. 3. In the illustrated embodiment, the termination includes a first busbar 66, a second busbar 68, and a tie connector 67. In addition, the termination includes one or more washers 72 and a fastener 70. In the illustrated embodiment, the busbar 66 represents, or is included in, the terminus of the power busway. Further, the busbar 68 is connected to the UPS and is included as a part of the UPS in some embodiments. For example, the busbar 68 can be connected to, or provided at, the output 33 referred to FIG. 1.

In the illustrated embodiment, the fastener 70 includes a nut and a bolt. According to one embodiment, the washer(s) 72 are conical washers. In a further embodiment either or both of the fastener 70 and the washer(s) 72 are Grade 5 hardware.

A different style or type of fastening hardware can be employed provided it is suitable to maintain the electrical connection between the busbar 66 and the busbar 68 through thermal cycling as a result of changes in the demand of the connected load and/or changes in ambient temperature.

The tie connector 67 can be employed to connect multiple busbar that are included for the same phase, neutral and/or ground conductor, respectively. For example, referring again to FIG. 3, each of phase A, phase B, phase C, and the neutral include two busbar connected together by a tie connector 67. Accordingly, in embodiments where these phase and neutral conductors each include multiple busbars, the tie connector 67 can be employed to connect the multiple busbars of the same conductor to one another.

Figure 5:
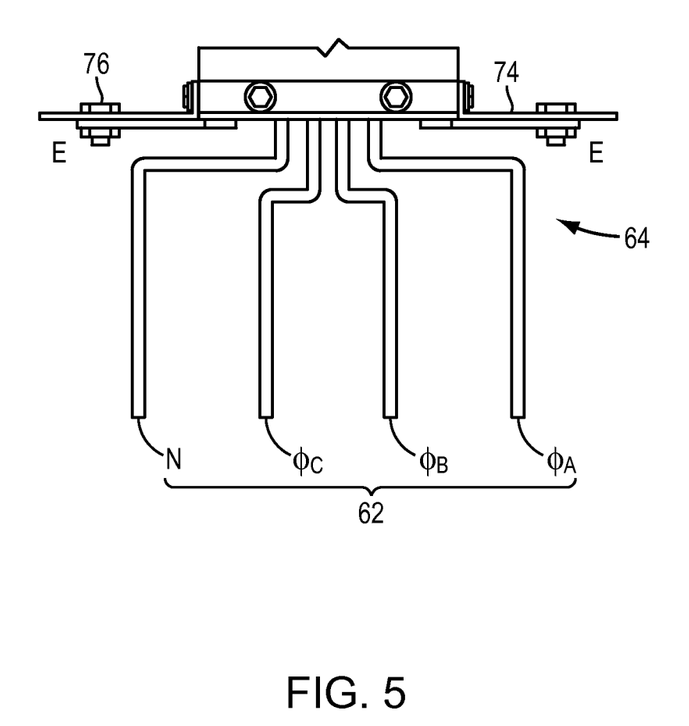
FIG. 5 illustrates a busway termination in accordance with one embodiment.

Referring now to FIG. 5, a busway termination 64 is illustrated in greater detail. According to the illustrated embodiment, the busway termination includes the plurality of busbar 62 and a flange 74 that is employed to secure the busway riser 60 to the UPS, for example, to the second enclosure 20. Here, a four pole power distribution system is represented. As mentioned above, however, three pole systems or other alternate configurations can be employed in various embodiments.

The flange 74 attaches at a wall or roof to the third enclosure 20 via one or more fasteners 76. The flange 74 attaches to a corresponding flange provided at the third enclosure 20. In some embodiments, one or more gaskets are used to provide a seal (for example, a dust tight or weather tight seal) where the flange 74 is attached to the second enclosure. As mentioned above, the busway termination 64 can be included at the terminus of the busway riser 60.

The busway termination 64 can be connected to the UPS output 33 via a bolted connection of the plurality of busbar 62 to a corresponding plurality of busbar provided at the UPS output 33, see for example, FIG. 3. In some embodiments, the resulting connection can be included in a complete busbar-to-busbar connection of the UPS output 33 to one or more power distribution units 12 without the use of cabling to complete the connection.

Embodiments can be employed with a wide variety of UPS designs including on-line UPSs, line-interactive UPSs, delta conversion UPSs, flywheel UPSs, motor-generator/battery UPSs and engine-coupled UPSs as some examples.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system, comprising:
a power busway including a plurality of busbars and a riser; and
an uninterruptible power supply (UPS), comprising:
a first input coupled to a source of AC power;
first power converter circuitry coupled to the first input, the first power converter circuitry including a first plurality of power switches employed to draw current in a controlled manner from the source of AC power, and a first output;
second power converter circuitry including a second input coupled to the first output, and a second output, the second power converter circuitry including a second plurality of power switches employed to draw DC current in a controlled manner and to provide AC power at the second output; and
an electrical enclosure housing each of the first power converter circuitry and the second power converter circuitry,
wherein the electrical enclosure includes an electrical connection coupled to the second output and configured for direct attachment to the riser;
wherein at least a portion of the power busway is located external to the electrical enclosure and at least a portion of the power busway extends through a roof portion of the electrical enclosure to couple to an electrical load located remote from the UPS.

2. The system of claim 1, wherein the UPS further comprises a static switch housed in the electrical enclosure, wherein the static switch is coupled to the electrical connection.

3. The system of claim 2, wherein the electrical enclosure includes a plurality of close-coupled sections including:
a first section configured to house at least one of the first power converter circuitry and the second power converter circuitry; and
a second section immediately adjacent the first section, the second section configured to house at least one of the static switch and the electrical connection.

4. The system of claim 3, wherein the static switch is located in the second section,
wherein the electrical enclosure includes a third section immediately adjacent the second section, and
wherein the electrical connection is located in the third section.

5. The system of claim 4, wherein the UPS further comprises a maintenance bypass switch coupled to the electrical connection.

6. The system of claim 5, wherein the maintenance bypass switch is located in the second section.

7. The system of claim 1, wherein the electrical connection includes an electrical bus sized and configured to allow a bolted connection directly between a terminus of the power busway and the electrical bus.

8. The system of claim 1, wherein the electrical connection is configured for direct attachment to a vertical riser of the power busway.

9. The system of claim 1, wherein the electrical connection is configured for direct attachment to a horizontal riser of the power busway.

10. The system of claim 1, wherein the electrical enclosure includes a throat sized and configured to directly attach to a housing of the power busway at a terminus of the power busway.

11. An electrical power system, comprising:
a power busway including a first terminus, at least one second terminus, and a first busway riser included in the power busway and providing the first terminus, the power busway including a plurality of busbars;
an uninterruptible power supply (UPS) including an input, an output, power conversion circuitry configured to receive AC power, convert the AC power to DC power, and convert the DC power to AC power provided at the output, and an electrical enclosure housing the power converter circuitry and including an electrical connection coupled to the output and configured for a direct attachment to the first busway riser at the first terminus; and
at least one power distribution unit configured for direct attachment to a second busway riser included in the power busway at the at least one second terminus,
wherein portions of the power busway are located external to the electrical enclosure and at least a portion of the power busway extends through a roof portion of the electrical enclosure, and wherein the at least one power distribution unit is located remote from the UPS.

12. The electrical power system of claim 11, wherein the UPS includes a first current rating equal to a rated output current of the UPS,
wherein the power busway includes a second current rating equal to a nominal current capacity of the power busway, and wherein the second current rating equals the first current rating.

13. The electrical power system of claim 11, wherein the at least one power distribution unit includes a plurality of close coupled electrical equipment racks.

14. The electrical power system of claim 13, wherein the at least one power distribution unit includes an input section configured for direct attachment to the second busway riser, and wherein the input section is close-coupled to an adjacent electrical equipment rack included in the plurality of close coupled electrical equipment racks.

15. The electrical power system of claim 14, wherein each of the plurality of electrical equipment racks is electrically connected to the input section by an electrical power cord, respectively.

16. The electrical power system of claim 15, wherein at least one of the plurality of electrical equipment racks includes a power strip including a plurality of receptacle outlets, and
wherein at least one of the respective electrical power cords includes a plug-connection to complete an electrical connection between the input section and the power strip.

17. The electrical power system of claim 11, wherein the at least one power distribution unit includes a plurality of power distribution units, wherein the at least one second terminus includes a plurality of second termini, and wherein each of the plurality of power distribution units is directly attached to one of the plurality of second termini, respectively.

18. A method of installing a power distribution system in a facility, the method comprising acts of:

obtaining a power distribution unit including at least one rack mounted power distribution unit, the power distribution unit including an electrical connection having an electrical bus configured to directly connect to a riser of a power busway;

installing the power busway from a terminus located at an output of a UPS to the electrical connection at the power distribution unit, the power distribution unit located remote from the UPS; and directly connecting the power busway to the output of the UPS through a roof portion of an equipment enclosure containing the UPS with a busbar-to-busbar connection between the output of the UPS and the terminus of the busway.

19. The method of claim 18, further comprising acts of:

obtaining a plurality of power distribution units each including at least one rack mounted power distribution unit, respectively, and also including an electrical connection having electrical bus configured to directly connect to a different riser of the power busway, respectively; and installing the power busway from the terminus included at the output of the UPS to the electrical connection at each the plurality of power distribution units, respectively.

20. The method of claim 18, further comprising an act of coupling the electrical connection to a plurality of overcurrent protective devices included in the power distribution unit.

* * * * *